United States Patent

MacPherson

[11] Patent Number: 5,862,623
[45] Date of Patent: Jan. 26, 1999

[54] SUBSTITUTE BAIT FISH COMPONENT FOR FISHING LURES

[76] Inventor: Gerald M. MacPherson, 1455 Slater Pl., Victoria, B. C., Canada, V8P 3R2

[21] Appl. No.: 867,574

[22] Filed: Jun. 2, 1997

[51] Int. Cl.$^6$ .................................................. A01K 85/00
[52] U.S. Cl. ...................... 43/42.24; 43/42.36; 43/42.29; 43/42.5; 43/42.06
[58] Field of Search .................... 43/42, 42.06, 42.09, 43/42.24, 42.29, 42.36, 42.45, 42.48, 42.5

[56] References Cited

U.S. PATENT DOCUMENTS

| | | | |
|---|---|---|---|
| 2,238,900 | 4/1941 | Hadaway | 43/42.36 |
| 2,791,056 | 5/1957 | Davis | 43/42.36 |
| 3,022,572 | 2/1962 | Kwisnek | 43/42.36 |
| 3,293,791 | 12/1966 | Hinkson | 43/42.24 |
| 3,403,469 | 10/1968 | Whitney | 43/42.26 |
| 3,760,529 | 9/1973 | Hicks | 43/42.36 |
| 4,133,132 | 1/1979 | Ellis et al. | 43/42.36 |
| 4,158,927 | 6/1979 | Capra et al. | 43/42.34 |
| 4,232,469 | 11/1980 | Shiverdecker | 43/42.37 |
| 4,236,342 | 12/1980 | Saia | 43/17.6 |
| 4,337,591 | 7/1982 | Gell et al. | 43/42.09 |
| 4,791,751 | 12/1988 | Francklyn | 43/42.36 |
| 4,815,147 | 3/1989 | Gazzano et al. | 2/161 A |
| 4,862,630 | 9/1989 | Welch | 43/42.26 |
| 4,869,014 | 9/1989 | Francklyn | 43/42.36 |
| 5,065,541 | 11/1991 | Coody | 43/42.29 |
| 5,221,227 | 6/1993 | Michels | 450/1 |
| 5,310,378 | 5/1994 | Shannon | 446/268 |
| 5,617,668 | 4/1997 | Shimandle | 43/44.8 |

Primary Examiner—Michael J. Carone
Assistant Examiner—Frederick T. French, III
Attorney, Agent, or Firm—Robert W. Jenny

[57] ABSTRACT

The substitute component is made of two mating layers of VELCRO™ material shaped in planform to resemble the body of a bait fish. The component can be manipulated during or after assembly to curve it to cause it to simulate the motions of an injured fish as it moves through water. The layers can be impregnated with material which provides fish attracting odors.

2 Claims, 1 Drawing Sheet

SUBSTITUTE BAIT FISH COMPONENT FOR FISHING LURES

BACKGROUND OF THE INVENTION

1. Field

The subject invention is in the field of fish lures, particularly those comprising a head assembly to which a bait fish component is attached.

2. Prior Art

There is much prior art, patented and not, in the general field of the subject invention and considerable prior art in the particular field of lures which comprise a head assembly to which a bait fish component is attached. However, in recent years, for a variety of reasons, the cost of bait fish has increased considerably. Also, at times in various locations the availability of suitable bait fish is noticeably limited. Accordingly, a prime objective of the subject invention is to provide a substitute for the bait fish component used in lures as described. Corollary objectives are that the substitute component be durable, economical, easy to use, adjustable to user's requirements and at least as effective as actual bait fish components.

SUMMARY OF THE INVENTION

The subject invention is a substitute bait fish component for use in fishing lures. A typical lure using such a component comprises a head assembly and the component attached to it. The head assembly comprises a shell, a headed pin, at least one hook and links and lines as needed to integrate the assembly. The shell resembles the hollow head of a small fish such as a herring and is open at the back. There is a hole in each side near the back edge. The shank of the headed pin fits through the holes and a hole in the bait component to attach the component to the head.

The component is flat and shaped in planform like the body of a small fish and sized to match the head-like shell. The component is flexible under gentle finger pressure and retains the shape it is flexed into and can be formed so that its action as it is moved through water resembles the action of an injured fish. The component is at least partly absorbent so that it can be saturated with oils or pastes which give off fish attracting odors.

The component can be made in a variety of ways. Examples are: (1) felt-like material laminated to a soft metal layer which enables the component to retain shapes or (2) open-cell foam plastic formed over a soft wire grid. However, in a preferred embodiment the component is made of two layers of VELCRO™ material, one loop layer and one hook layer, fully engaged with each other. The loop layer is saturated with the fish attracting material. The component assembly is shaped either as the two layers are attached to each other or by manipulation after the layers are engaged. The hooks and loops inhibit change of the flexed shape of the component.

The invention is described in more detail below with reference to the attached drawings.

DETAILED DESCRIPTION OF THE INVENTION

Figure 1:
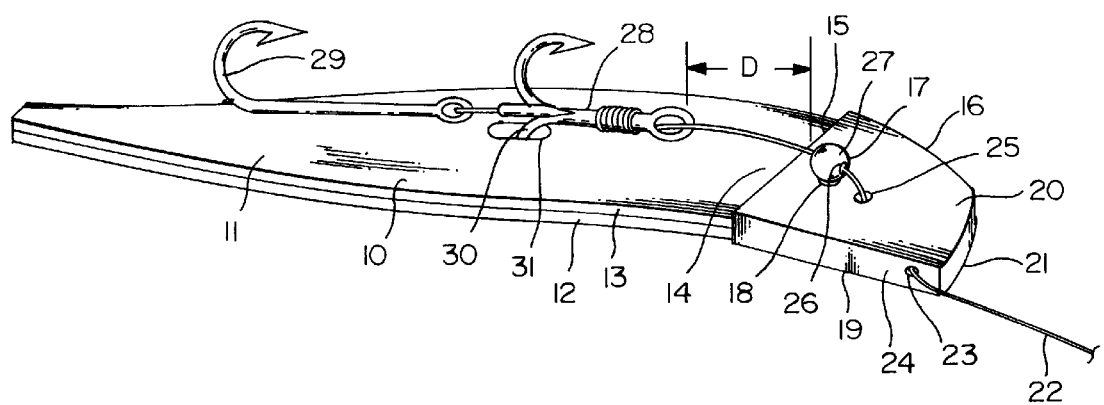
FIG. 1 is a general view of a lure incorporating a preferred embodiment of the subject invention.

The subject invention is a substitute bait fish component for fishing lures. FIG. 1 illustrates lure 10 incorporating a preferred embodiment of the subject component 11. Component 11 is an assembly of two layers 12 and 13 of VELCRO™ material shaped in planform to resemble the body of a small fish. Layer 12 is a hook layer and layer 13 is a loop layer. End 14 of the component is inserted into open end 15 of head element 16 and retained in the head element by pin 17. The pin is inserted through holes 18 and 19 (hole 19 not visible in this view) in sides 20 and 21 respectively of the head element. Fishing line or leader 22 is threaded into the head element through hole 23 in bottom 24 of the head element and out of the head element through hole 25 in side 20 which is located a short distance forward of hole 18. The line is threaded through hole 26 in head 27 of pin 17 and attached to hooks 28 and 29. Hook 28 has three prongs and prong 30 is fitted through slot 31 which extends through both layers of component 11. A toothpick or the equivalent is forced into hole 26 alongside the line to restrict lengthwise movement of the line through the hole and set distance D such that prong 30 is retained in slot 31. Tension in the line keeps the pin inserted.

Figure 2:
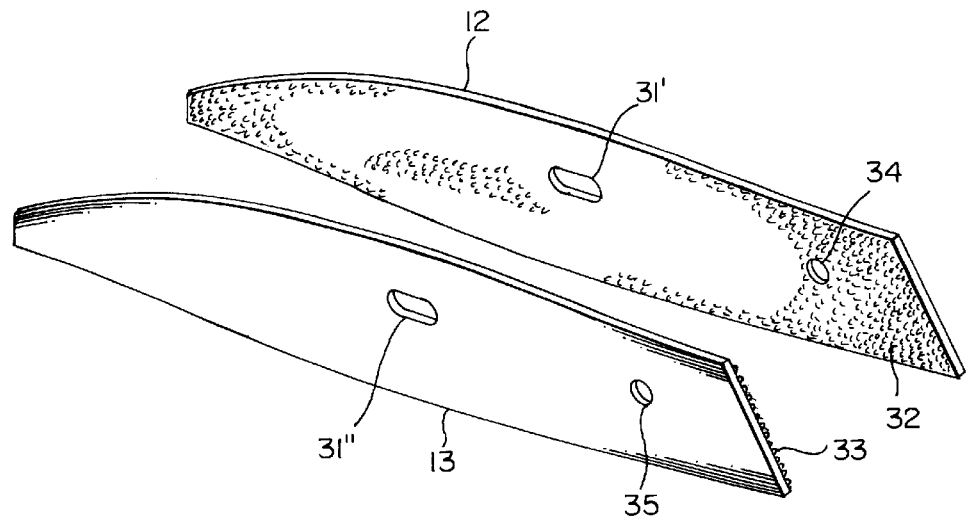
FIG. 2 is an exploded view of the substitute bait component in the FIG. 1 embodiment.

FIG. 2 is an exploded view of layers 12 and 13 of the substitute bait component showing the hooks, hook 32 being typical, of layer 12 and the loops, loop 33 being typical, of layer 13. Pin 17 fits through hole 34 in layer 12 and hole 35 in layer 13 to attach the bait component to the head element. Slots 31' in layer 12 and 31" in layer 13 make up slot 31 in the component. The hooks and loops extend over the entire areas of surfaces of the layers and inhibit flexing of the layers so that the component can be flexed to a desired shape and retains that shape.

The configuration of this lure is well known in the art except for the substitution of the subject substitute bait component for a similarly shaped slice of fish meat. The meat cannot be shaped to affect the motion of the lure in the water. The odor of the meat is simulated in the substitute component by application of commercially available liquids and/or pastes which produce the odors of fish meat.

It is considered to be understandable from this description that the subject invention meets its objectives. It provides a substitute for the bait fish component used in lures as described and the substitute component is durable, economical, easy to use and adjustable to user's requirements in terms of causing the lure's movements in the water to simulate the movements of an injured fish. Also, developmental testing using the subject component has shown that it is at least as effective as actual bait fish components.

It is also considered to be understood that while a preferred embodiment of the subject invention is described herein, other embodiments and modifications of the one described in detail are possible within the scope of the invention which is limited only by the attached claims.

I claim:

1. A substitute bait fish component for use as a component of a fishing lure, said lure comprising a head element shaped to resemble the head of a fish and being hollow and having an open head end, said substitute bait fish component being made to resemble the body of a fish and having a component end which is sized and shaped to be inserted into said open head end, said lure further comprising means to retain said component end in said head element, said substitute bait fish component comprising first and second layers of VELCRO™ material, said first layer having hooks, said second layer having loops, said first and second layers being joined by said hooks and loops such that said substitute bait fish component can be flexed from a first shape to a second shape and said hooks and loops tend to inhibit the flexing and to retain said component in said second shape.

2. The substitute bait fish component of claim 1 comprising:

soft absorbent material in the shape of the body of a fish and a soft metal element, said metal element being integrated with said soft material such that said component can be flexed from a first shape to a second shape and retains said second shape.

* * * * *